United States Patent [19]

Brooks

[11] Patent Number: 4,627,556

[45] Date of Patent: Dec. 9, 1986

[54] ICE DISPENSER FOR A HOUSEHOLD REFRIGERATOR

[75] Inventor: Robert B. Brooks, Louisville, Ky.

[73] Assignee: General Electric Company, Louisville, Ky.

[21] Appl. No.: 634,745

[22] Filed: Jul. 26, 1984

[51] Int. Cl.[4] .................. B65G 65/46; F25C 5/16; G01F 11/24

[52] U.S. Cl. .................. 222/240; 222/413; 198/676

[58] Field of Search .............. 222/413, 412, 240, 241; 221/75; 62/266, 320; 198/676, 677

[56] References Cited

U.S. PATENT DOCUMENTS

| | | | |
|---|---|---|---|
| 2,942,435 | 6/1960 | Nelson | 62/233 |
| 3,422,994 | 1/1969 | Alvarez | 222/240 |
| 3,437,244 | 4/1969 | Alvarez et al. | 222/240 |
| 3,602,406 | 8/1971 | Jacobus et al. | 222/413 |
| 3,602,441 | 8/1971 | Alvarez | 241/101 |
| 3,798,923 | 3/1974 | Pink et al. | 62/266 |
| 4,084,725 | 4/1978 | Buchser | 221/75 |
| 4,158,426 | 6/1979 | Frohbieter | 222/1 |
| 4,176,527 | 12/1979 | Linstromberg et al. | 62/320 |
| 4,322,021 | 3/1982 | Olsson | 222/231 |

Primary Examiner—F. J. Bartuska
Attorney, Agent, or Firm—Frederick P. Weidner; Radford M. Reams

[57] ABSTRACT

An ice piece dispenser comprising a receptacle for storing ice pieces and including a front plate having a discharge opening therein. There is provided a dispenser horizontally supported in the receptacle and includes a rotatable feed section having an inlet end and a discharge end with a central axle therebetween, the feed section comprising a cylindrical collar adjacent the front plate and a double bladed screw auger within the collar forming two helical passages. The blades of the screw auger extend from the central axle to the collar and are spaced rearwardly from the front plate with the trailing edge of each blade being curved rearwardly between the axle and collar sufficiently to prevent ice pieces being wedged between the front plate and the blades during rotation of the feed section. A wire auger which is rotatably driven is secured to the feed section for rotation in unison therewith.

12 Claims, 5 Drawing Figures

ICE DISPENSER FOR A HOUSEHOLD REFRIGERATOR

BACKGROUND OF THE INVENTION

The present invention relates to an ice piece dispenser for a conventional household refrigerator and more specifically to an ice dispenser of the type disclosed and claimed in U.S. Pat. No. 3,422,994 issued Jan. 21, 1969, U.S. Pat. No. 3,437,244 issued Apr. 8, 1969 and U.S. Pat. No. 3,602,441 issued Aug. 31, 1971. Briefly described, such a dispenser comprises a receptacle for receiving and storing ice pieces from an automatic ice maker and dispensing means rotatably supported in a horizontal position within the receptacle so that, upon operation thereof, ice pieces will be automatically dispensed through a discharge opening in the front end of the receptacle. The dispensing means comprises a feed section for feeding ice pieces to the discharge opening and a conveying section connected to the feed section and rotatable therewith. The feed section comprises a cylindrical collar containing therein a double bladed screw auger or metering helix rotatable with the collar and the discharge opening is positioned relative to the outlet of the feed section. The feed section also adjusts the delivery rate of the ice pieces to prescribed limits for user convenience and also provides a moderate flow rate of ice pieces independently of the reservoir or receptacle fill level.

To continually move ice pieces into the rotatable feed section there is employed a collector wire auger having a helically coiled portion connected at one end to the feed section and the other end is connected to drive means for rotating the wire helical auger and feed section. The transition from the collector wire auger to the feed section is accomplished by maintaining a transition pool of continually moving ice pieces at the auger output and allowing the ice pieces to fall into the metering helix within the collar of the feed section as they randomly present themselves in the proper position and orientation.

For maximum enjoyment of an ice piece dispenser in a household refrigerator, it is desirable that the dispenser provide both whole ice pieces and crushed ice. That is, the user has an option to operate the dispensing means so that a selection may be made as to delivery of either whole ice pieces or crushed ice. Ice piece dispensers using a feed section as described above move the ice pieces through the feed section and then encounter a stationary plate having a discharge opening. Ice pieces that fall through the opening are delivered optionally to the user's glass or to the crusher blades of the dispenser before the crushed ice is dispensed into the glass depending upon selection by the user. Those ice pieces that do not exit smoothly through the stationary plate discharge opening are sometimes carried past the lower portion of the stationary plate opening and are jammed or wedged between the blades of the screw auger in the feed section and the upper edge of the opening.

By this invention there is provided a different shape feed section and particularly the shape of the blades of the screw auger of the feed section that prevents ice pieces from being jammed if they do not exit smoothly through the stationary plate opening.

SUMMARY OF THE INVENTION

There is provided an ice piece dispenser comprising a receptacle for storing ice pieces and including a front plate having a discharge opening therein. Dispensing means is horizontally supported in the receptacle and includes a rotatable feed section having an inlet end and a discharge end and a central axle therebetween, the feed section comprising a cylindrical collar adjacent the front plate and a double bladed screw auger forming two helical passages. The blades of the auger extend from the central axle to the collar and are spaced rearwardly from the front plate with the trailing edge of each blade being curved rearwardly between the axle and collar sufficiently to prevent ice pieces being wedged between the front plate and the blades during rotation of the feed section. The ice piece dispenser also includes a rotatable wire auger secured to the feed section and drive means engaging the rotatable wire auger at the end opposite from the feed section for rotation of the feed section in unison with the wire auger.

DESCRIPTION OF THE PREFERRED EMBODIMENT

Figure 1:
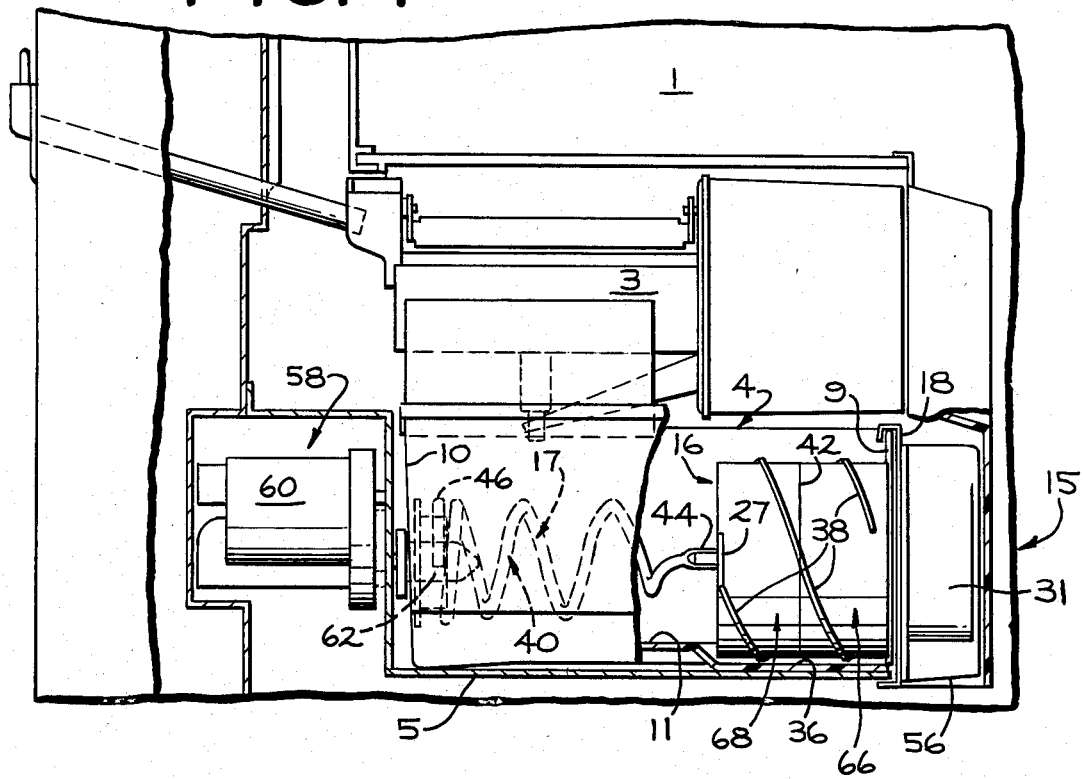
FIG. 1 is a sectional side view of a portion of the freezer compartment of a household refrigerator including the ice piece dispenser of the present invention.
Figure 2:
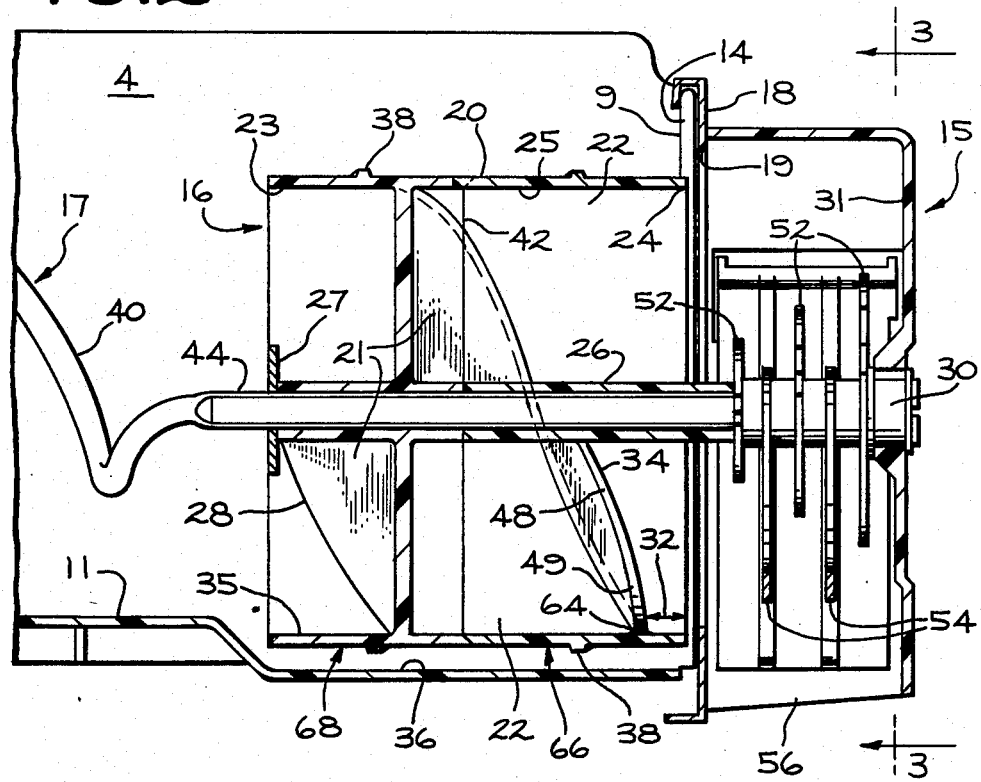
FIG. 2 is an enlarged sectional view of the ice piece dispenser illustrated in FIG. 1.
Figure 3:
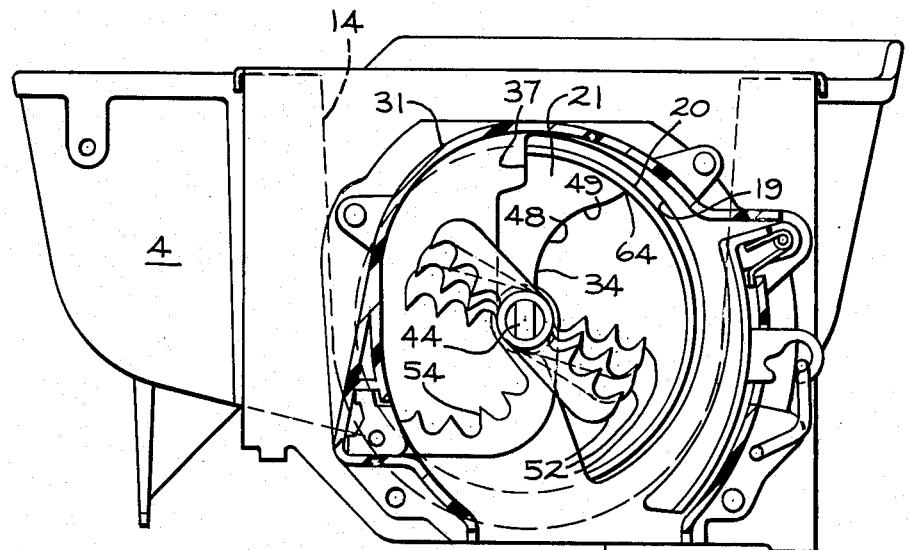
FIG. 3 is a front view of the ice piece dispenser taken along lines 3—3 of FIG. 2.

In FIGS. 1, 2 and 3 of the drawing, there is illustrated a household refrigerator comprising a freezer compartment 1 having an access opening at the front thereof closed by a door (not shown). Within the upper portion of the freezer compartment 1, there is mounted an automatic ice maker 3 which may be of the well-known types presently provided in household refrigerators for the automatic production of ice pieces, generally referred to as ice cubes regardless of their particular shapes. These ice pieces are discharged into a storage bin or receptacle 4 which serves not only to store the manufactured ice pieces at sub-freezing temperatures but also forms part of an ice dispenser designed to automatically dispense the stored ice pieces as required by the user.

The receptacle 4, which is removably supported on a supporting shelf 5 below the ice maker 3, is relatively wide and relative shallow and includes vertical front and rear walls 9 and 10 and an arcuate or concave bottom wall 11. The front wall 9 of the receptacle 4 is provided with a dispensing opening 14. Adjacent and in front of the dispensing opening 14 is a metal plate 18 secured to the receptacle 4 which metal plate has a discharge opening 19 to allow ice pieces to pass therethrough.

For the purpose of conveying ice pieces stored in the receptacle 4 to the discharge opening 14 and opening 19 in the metal plate 18, there is provided within the receptacle 4 a dispensing means generally indicated by the number 15. It extends lengthwise of the receptacle 4 adjacent the lowermost portion of the arcuate bottom wall 11 and in alignment with the discharge opening 14 and is pivotally supported in a horizontal position on the front and rear walls 9 and 10 of the receptacle 4 for rotational movement about its horizontal axis. It essentially comprises a feed section 16 at the front end thereof and a conveyor section 17 connected to the feed section and forming the rear portion of the dispensing means.

The conveyor section 17 comprises a rotatable helically coiled wire auger 40 secured to the cylindrical, rotatable feed section 16 at one end 44 and at the opposite end 46 to a bifurcated yoke 62. The one end 44 is secured to the feed section 16 by means of an inlet blade 27 which in the preferred embodiment is made of rigid metal and secured to the feed section 16. The elongate axial one end 44 may be flattened to be inserted into a complimentary slightly larger rectangular shaped opening through the center of the inlet blade 27 so that upon rotation of the elongate axial one end 44 the feed section 16 will be rotated in unison therewith. It will be noted that the flattened one end 44 extends through the feed section 16 and is rotatably secured by a bearing nut 30 to a housing portion 31 of the dispensing means 15. In ice dispensers that have an ice crusher option, blades 52, which are utilized for crushing ice pieces during operation of the dispensing means, are secured to the one end 44 of the wire auger 40 just ahead of the bearing nut 30 and within housing portion 31. The ice crusher blades 52 rotate with the wire auger 40 and the feed section 16 in a counterclockwise direction as seen in FIG. 3. In the selected ice crusher mode ice pieces falling through opening 19 in plate 18 are picked up by the rotating ice crusher blades 52 and carried around inside housing portion 31 to stationary ice crusher blades 54 where the ice pieces are crushed in the manner described in U.S. Pat. No. 3,602,441 and the crushed ice dispensed through opening 56 at the bottom of housing portion 31.

The wire auger 40 is a one piece wire construction and has a transitional section at end 46 with a portion (not shown) being bent perpendicular to the axis of the wire auger 40 to form key means for connecting a yoke 62 which is connected to the drive means 58 to rotate the auger and feed section. The drive means 58 (FIG. 1) consists of an electric motor 60 which through appropriate transmission means drives the bifurcated yoke 62 which engages the bent portion of the wire auger 40 so that upon rotation of the yoke 62 the wire auger and feed section will be rotated in unison.

The feed section 16 as illustrated in the drawing comprises an open ended sleeve or collar 20 having an inlet end 23 and an outlet end 24 having the same diameter and containing a conveyor screw in the form of two auger blades 21 which forms within the collar 20 two diametrically opposed helical passages 22 of a cross-sectional area such that ice pieces entering the inlet end 23 of the feed section advance through the passages 22 during rotation of the feed section 16. The feed section is of a length such that during normal operation of the dispenser, a plurality of ice pieces are stored within each of the passages 22 so that a controlled number of ice pieces can be discharged through the discharge opening 14 in the receptacle 4 and opening 19 in plate 18 upon each half revolution of the feed section. It has been found that satisfactory operation of the feed section 16 may be accomplished by dimensioning the helical passages 22 such that each can accommodate more ice pieces than actually dispensed during operation. It is desirable to dispense an average of four ice pieces per revolution of the feed section 16 and one revolution approximately every two seconds is a satisfactory rate of dispensing for normal use of the ice dispenser.

As previously described, the inlet end 23 of the feed section 16 has a metal member 27 which in the preferred embodiment is a somewhat sharp inlet blade engaging and spanning the inlet end 23 at the rear or leading edges 28 of the auger blades 21. The inlet blade 27 is positioned relative to the leading edges 28 of the auger blades 21 so that its edges in effect lead the auger blade edges 28 during rotation of the feed section to provide a relatively sharp means for engaging and breaking up ice clumps as these clumps try to enter the inlet end 23 of the feed section 16 under the advancing effect of the conveyor section 17. In addition, since the blade 27 overhangs or leads the leading edges 28 of the blades 21, this overhand restricts the effective inlet area of the passages 22 and further assures that once an ice piece has passed this point and entered the feed section, it will flow freely through the feed section. The feed section 16 is rotatably supported at the front end of the receptacle 4 and is positioned in a shallow arcuate depression 36 in the bottom wall of the receptacle. The lower part of collar 20 is spaced a short distance from this depression 36 and the depression is of a depth such that the inner surface 35 of the collar is slightly below the adjacent surface of the receptacle bottom wall 11 rearwardly of the feed section 16 to facilitate entrance of ice pieces into the feed section. As ice chips or fragments tend to collect in this depression 36, the outer surface of the collar 20 is also preferably provided with an external helical rib 38 having a pitch opposite to that of the blades 21. Thus during rotation of the feed section to advance ice pieces through the feed section to the outlet 14, the reverse pitch of the exterior ribs 38 sweeps ice chips and fragments rearwardly to maintain the space between the feed section 16 and the arcuate depression 36 substantially free of such chips and fragments.

Figure 4:
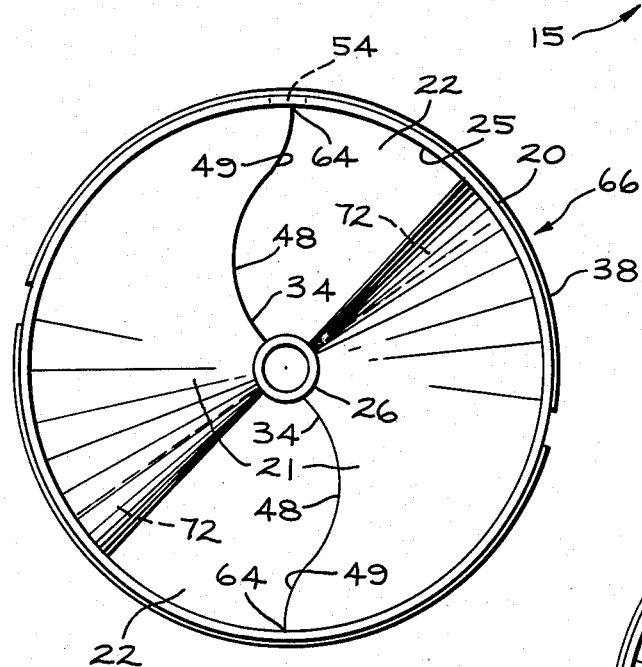
FIG. 4 is a plan view of the end of the feed section of the ice piece dispenser of the present invention.

With reference particularly to FIGS. 2-5 of the drawing, the double bladed screw auger has blades 21 extending from the central axle 26 to the inside surface 25 of the collar 20. The blades 21 are spaced a distance rearwardly from the front plate 18 which distance is indicated by number 32 in FIG. 2. Heretofore in the feed sections of dispensers of this type the blades extended from one end to the other end of the collar and in very close proximity to the metal plate 18. In this invention not only are the blades spaced from plate 18 but the trailing edge 34 of each blade 21 also has a curved section 48 between the axle 26 and the inside surface 25 of the collar 20 as best seen in FIG. 4. The curved section 48 is curved rearwardly, that is, in the direction of the inlet end 23 of the feed section 16. It will be noted that the trailing edge 34 is downstream relative to the direction of ice piece flow through the feed section 16. The rearward curve 48 of the trailing edge of each blade begins inwardly of the junction 64 between the blades 21 and collar 20 and starts at a smooth curved transition section 49.

In prior art ice piece dispensers of the type disclosed herein it has been found with the trailing edge of the blades being in very close proximity to the opening through the metal plate 18 and having straight trailing edges that during rotation of the feed section 16 ice pieces would on occasion only partially fall through the opening in the metal plate 18 and be wedged against the opening edge 37 by the blades 21 at the top of the opening thus causing stalling of the dispensing mechanism with possible injury to the mechanical components particularly the feed section blades 21. With the configuration of the blades 21 by being set back in the outlet section 24 a distance away from the metal plate 18 and having the trailing edge of each blade curved rearwardly the ice pieces are not so wedged because they have sufficient space to be urged back into the helical passage 22. During the next revolution of the feed section these ice pieces are then again exposed to the opening in the metal plate 18 and fall through the opening in the normal fashion.

It will be appreciated that the amount of setback of the trailing edges of the blades relative to the metal plate 18 and the amount of the trailing edge curvature between the axle and collar should be sufficient to prevent the ice pieces being wedged between the front plate 18 and the blades 21 during rotation of the feed section 16 and that these dimensions will vary depending on the dimensions of the ice pieces being utilized in the dispensing system. It has been found that the set back space or distance 32 may be approximately half the lateral diameter of the ice pieces being dispensed for satisfactory operation of the feed section with the elimination of ice pieces being wedged between the front plate 18 and blades 21. The set back distance 32, however, should not be too great as to result in unsatisfactory flow of ice pieces through the opening 19 in the plate 18 during rotation of the feed section 16. This is the reason it is beneficial in the preferred embodiment of this invention to have the rearward curve 48 of the trailing edge of each blade begin inwardly of the junction 64 rather than at the junction 64 as it has been found that this configuration prevents ice piece jamming yet produces satisfactory ice piece flow from the feed section through the plate 18 to opening 19.

Figure 5:
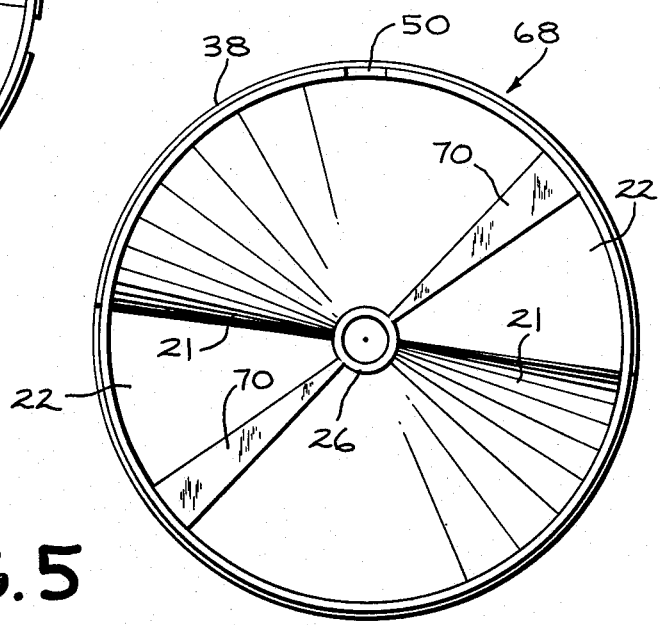
FIG. 5 is a plan view of the opposite end of the feed section shown in FIG. 4.

In the preferred embodiment the collar 20 and blades 21 of the feed section 16 are formed as two separate bodies 66 and 68, one shown in FIG. 4 and one shown in FIG. 5. These two bodies are then mated together as shown by the mating line 42 in FIG. 2. Each of the two bodies are molded from suitable plastic material and it will be noted in FIg. 5 there is a flat portion 70 between the central axle 26 and the inner surface 25 of the collar which mates with a corresponding flat surface 72 shown in dotted in FIG. 4. The mating of the two bodies is achieved by having one keyed to the other by a notch 50 in one body, such as body 68, and a complementary projection 54 in the other body 66 for the correct orientation of the blades 21 and cavities 22 and then secured together.

While there has been shown and described a specific embodiment of the invention, it will be understood that it is not limited thereto and it is intended by the appended claims to cover all such modifications as fall within the true spirit and scope of the invention.

What is claimed is:

1. An ice piece dispenser comprising:
a receptacle for storing ice pieces and including a front plate having a discharge opening therein;
dispensing means horizontally supported in said receptacle and including,
a rotatable feed section having an inlet end and a discharge end and a central axle, said feed section comprising two separate bodies mated together and having a cylindrical collar adjacent the front plate and a double bladed screw auger forming two helical passages, said blades extending from the central axle to the collar with the junction of the blades and central axle being spaced rearwardly from the front plate and the trailing edge of each blade being curved rearwardly in the direction of the inlet end of the feed section between the axle and collar sufficiently to prevent ice pieces being wedged between the front plate and the blades during rotation of the feed section,
a rotatable wire auger secured to the rotatable feed section, and
drive means engaging the rotatable wire auger at the end opposite the feed section.

2. The ice piece dispenser of claim 1 wherein the inlet end of the feed section has a metal blade spanning the collar and secured to the feed section for rotation of the feed section with the auger.

3. The ice piece dispenser of claim 1 wherein the collar diameter at the inlet end and the discharge end are the same.

4. The ice piece dispenser of claim 1 wherein the helical passages can accommodate sufficient ice pieces to dispense an average of four ice pieces per revolution of the feed section.

5. The ice piece dispenser of claim 4 wherein the feed section rotates at the rate of approximately one rotation every two seconds.

6. The ice piece dispenser of claim 1 wherein the blades are spaced rearwardly from the front plate a distance approximately half the lateral diameter of the ice pieces being dispensed by the feed section.

7. The ice piece dispenser of claim 1 wherein the rearward curved of the trailing edge of each blade begins inwardly of the junction between the blades and collar.

8. The ice piece dispenser of claim 1 wherein the two separate bodies are molded from plastic material.

9. An ice piece dispenser comprising:
a receptacle for storing ice pieces and including a front plate having a discharge opening therein;
dispensing means horizontally supported in said receptacle and including,
a rotatable feed section having an inlet end and a discharge end and a central axle, said feed section comprising two separate bodies mated together and having a cylindrical collar adjacent the front plate and a double bladed screw auger forming two helical passages, each passage being dimensioned to accommodate up to four ice pieces, said blades extending from the central axle to the collar with the junction of the blades and central axle being spaced rearwardly from the front plate a distance approximately half the lateral diameter of the ice pieces being dispensed by the feed section and the trailing edge of each blade being curved rearwardly in the direction of the inlet end of the feed section between the axle and collar sufficiently to prevent ice pieces being wedged between the front plate and the blades during rotation of the feed section, each blade beginning inwardly of the junction between the blades and collar,
a rotatable wire auger secured to the rotatable feed section, and
drive means engaging the rotatable wire auger at the end opposite the feed section and rotating the feed section approximately one revolution every two seconds.

10. The ice piece dispenser of claim 9 wherein the inlet end of the feed section has a metal blade spanning the collar and secured to the feed section for rotation of the feed section with the auger.

11. The ice piece dispenser of claim 9 wherein the collar diameter at the inlet end and the discharge end are the same.

12. The ice piece dispenser of claim 9 wherein the two separate bodies are molded from plastic material.

* * * * *